(12) United States Patent
Raveendran et al.

(10) Patent No.: US 11,803,525 B2
(45) Date of Patent: Oct. 31, 2023

(54) SELECTION AND MOVEMENT OF DATA BETWEEN NODES OF A DISTRIBUTED STORAGE SYSTEM

(71) Applicant: Hewlett Packard Enterprise Development LP, Houston, TX (US)

(72) Inventors: Anoop Kumar Raveendran, Bangalore Karnataka (IN); Sri Satya Sudhanva Kambhammettu, Bangalore Karnataka (IN); Narayanan Ananthakrishnan Nellayi, Bangalore Karnataka (IN); Subhakar Vipparti, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 247 days.

(21) Appl. No.: 17/302,021

(22) Filed: Apr. 21, 2021

(65) Prior Publication Data

US 2022/0100716 A1 Mar. 31, 2022

(30) Foreign Application Priority Data

Sep. 29, 2020 (IN) .............................. 202041042408

(51) Int. Cl.
*G06F 16/00* (2019.01)
*G06F 16/21* (2019.01)
*G06F 16/22* (2019.01)
*G06F 16/215* (2019.01)
*G06F 16/28* (2019.01)

(52) U.S. Cl.
CPC .......... *G06F 16/214* (2019.01); *G06F 16/215* (2019.01); *G06F 16/2237* (2019.01); *G06F 16/2246* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 9,424,285 | B1 | 8/2016 | Condict et al. |
| 10,095,428 | B1 * | 10/2018 | Meiri .................... G06F 3/0647 |
| 10,162,867 | B2 | 12/2018 | Harnik et al. |
| 10,198,455 | B2 | 2/2019 | Harnik et al. |
| 2014/0244604 | A1 | 8/2014 | Oltean et al. |
| 2016/0077924 | A1 | 3/2016 | Todd et al. |
| 2016/0085751 | A1 | 3/2016 | Camble et al. |

(Continued)

OTHER PUBLICATIONS

Harnik, D., et al., "Sketching Volume Capacities in Deduplicated Storage", Proceedings of the 17th USENIX Conference on File and Storage Technologies (FAST '19), Feb. 25, 2019, pp. 107-119.

(Continued)

*Primary Examiner* — Thu Nguyet T Le
(74) *Attorney, Agent, or Firm* — Trop, Pruner & Hu, P.C.

(57) ABSTRACT

Example implementation relates to a method for managing movement of set of entities associated with sampled data units in a cluster of nodes of a distributed storage system. A database is maintained for sampled data units received from the cluster of nodes. The method includes maintaining lineage information for the set of entities associated with the sampled data units received from each node. Based on the lineage information of a source node, a data set for migration is determined.

19 Claims, 14 Drawing Sheets

(56) References Cited

U.S. PATENT DOCUMENTS

2016/0110260 A1 4/2016 Chandrasekharan et al.
2020/0301593 A1 9/2020 Vaithianathan et al.

OTHER PUBLICATIONS

Lillibridge, M., et al.; "Sparse Indexing: Large Scale, Inline Deduplication Using Sampling and Locality"; Jan. 2009; pp. 111-123; USENIX Association.
Lu, M., et al., "Content Sharing Graphs for Deduplication-Enabled Storage Systems", Algorithms, Apr. 10, 2012, pp. 236-260.
P.C. Nagesh et al., "Rangoli: Space management in deduplication Environments", Proceedings of the 6th International Systems and Storage Conference, Jun. 2013, 6 pages.
Servat, H. et al.; "Automating the Application Data Placement in Hybrid Memory Systems"; Sep. 2017; 11 pages; IEEE.

* cited by examiner

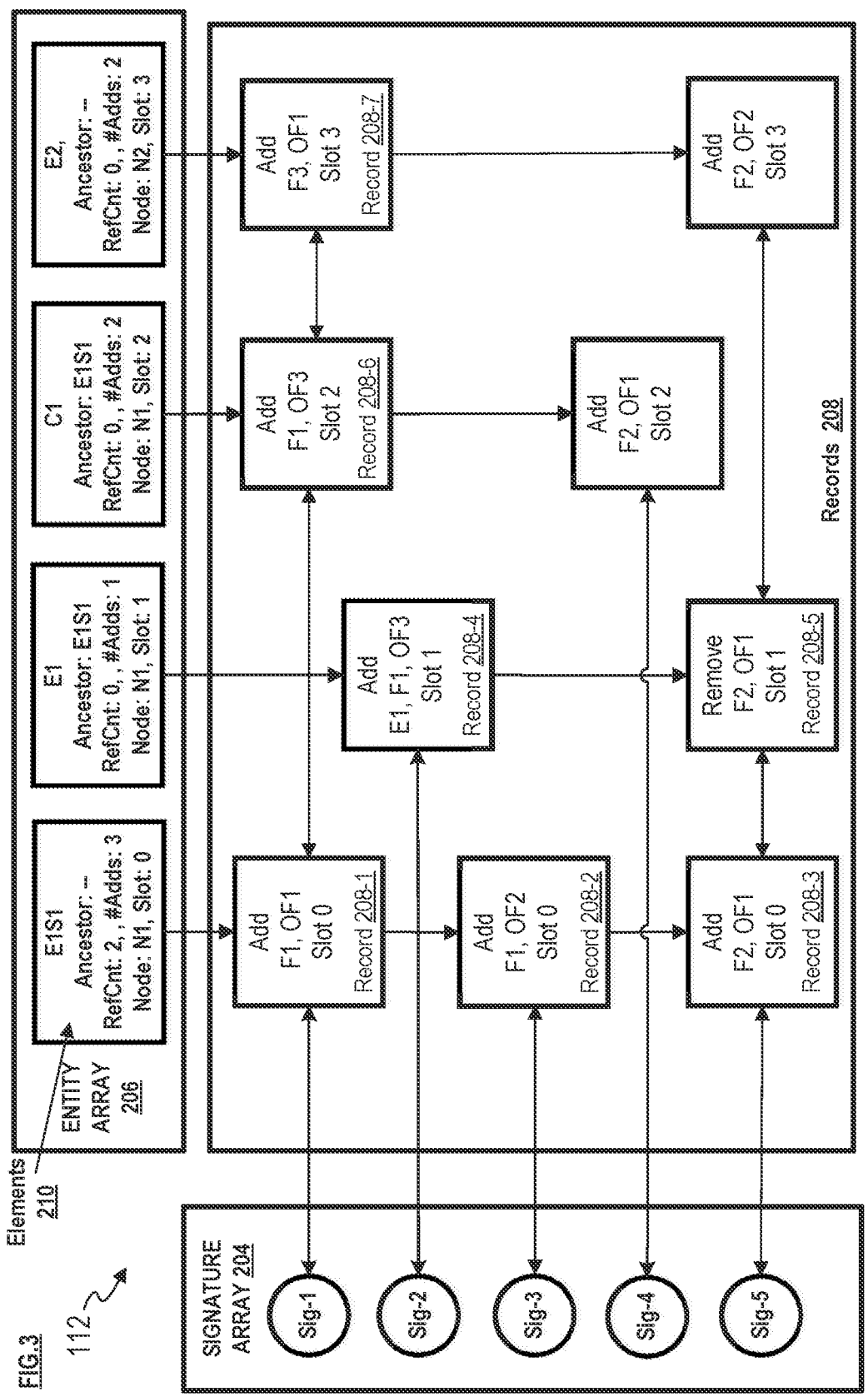

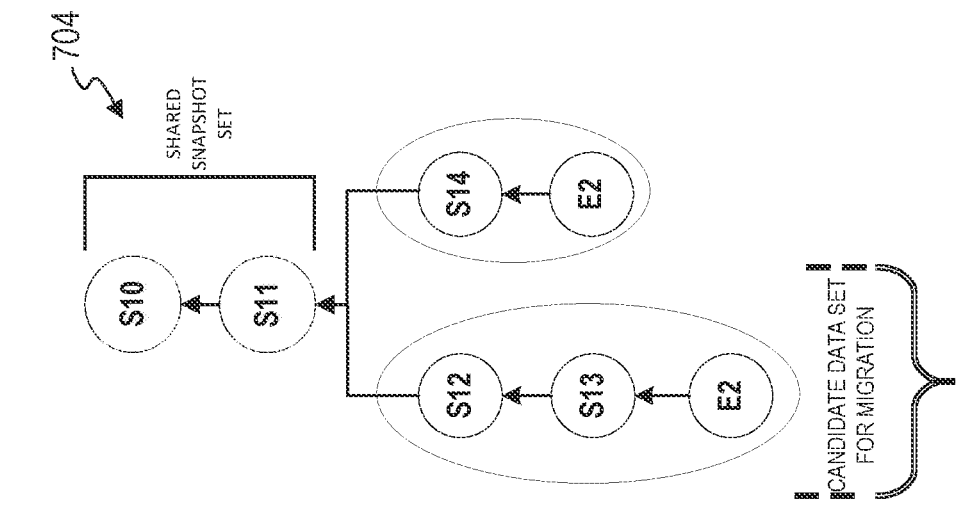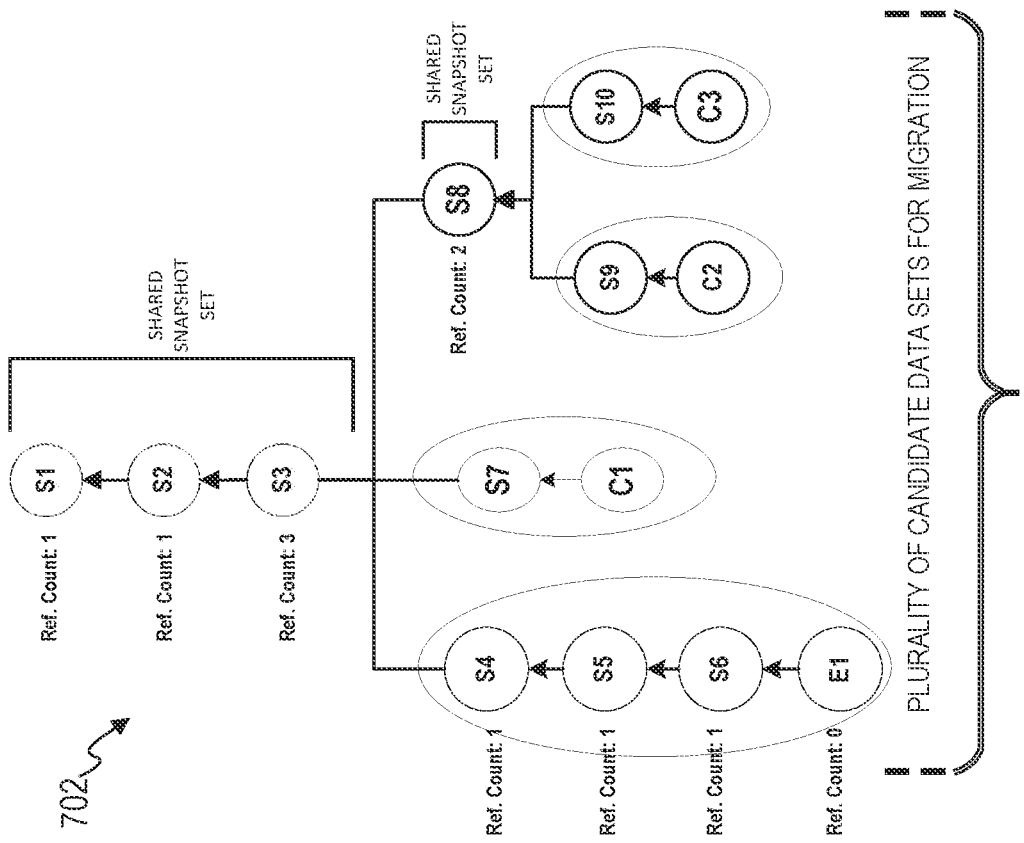
FIG. 7

SELECTION AND MOVEMENT OF DATA BETWEEN NODES OF A DISTRIBUTED STORAGE SYSTEM

BACKGROUND

Data deduplication removes redundant data to improve storage space utilization. In storage systems implementing data deduplication, duplicate data units (i.e., data units having the same data at different locations on a storage device) are deleted from the storage device. When data deduplication is performed on the storage system, one unique (or distinct) instance of the data unit is stored. The other instances of the same data contain a reference to the unique instance of the data unit.

In large scale distributed storage systems with multiple storage nodes and massive amount of data, data deduplication may be performed at individual nodes. However, the data deduplication at individual nodes may not be sufficient to manage deduplication across the multiple storage nodes.

BRIEF DESCRIPTION OF THE DRAWINGS

The drawings provide examples and/or implementations consistent with the description; however, the description is not limited to the examples and/or implementations provided in the drawings.

FIG. 3 illustrates an example of a data structure maintained on the central node.

FIG. 7 depicts example of lineage trees for determining the data set for migration.

DETAILED DESCRIPTION

Figure 1:
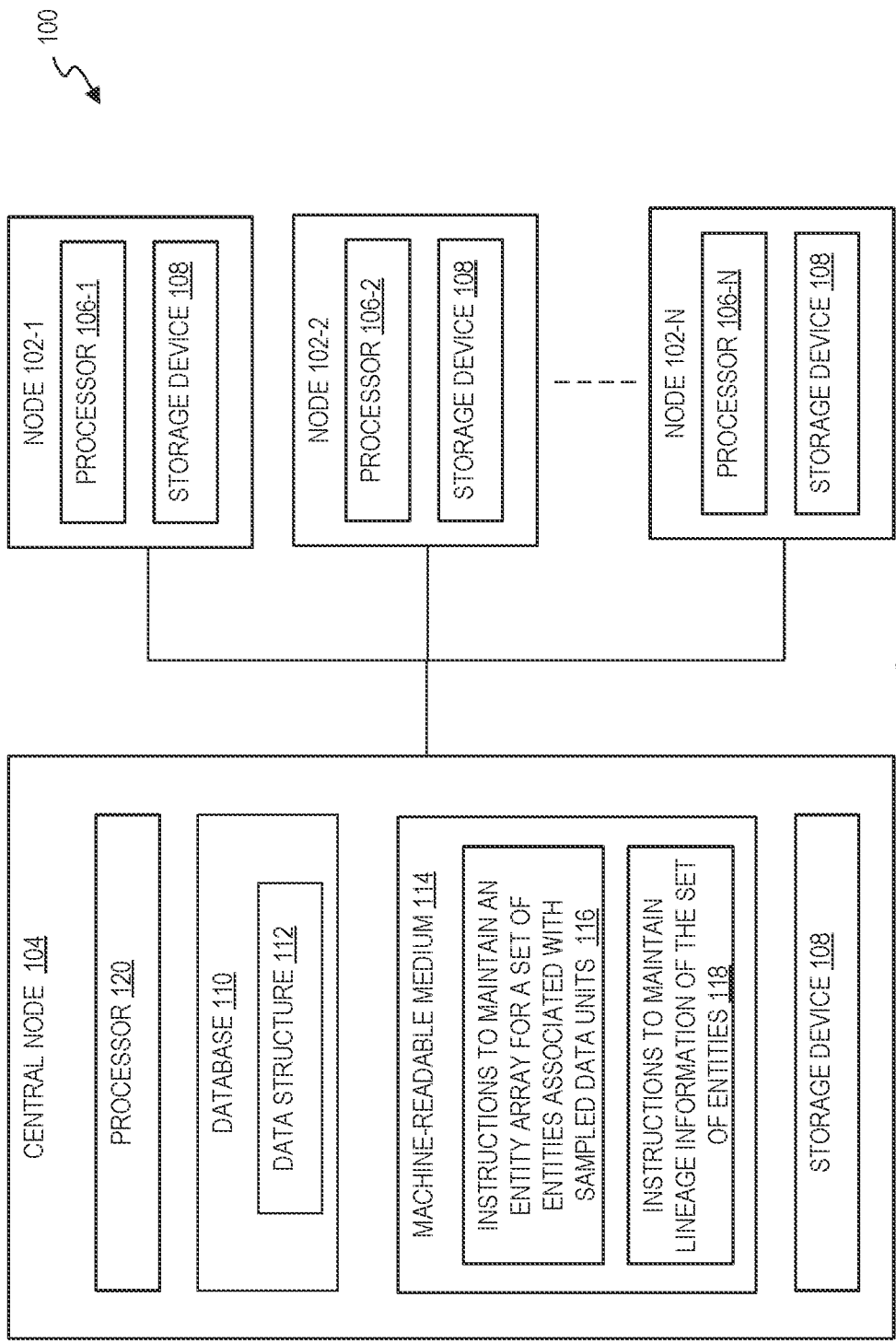
FIG. 1 illustrates a block diagram of a distributed storage system, in accordance with examples of the present disclosure.

The following detailed description refers to the accompanying drawings. Wherever possible, the similar reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing example embodiments only and is not intended to be limiting. As used herein, the singular forms "a," "an," and "the" are intended to include the plural forms as well, unless the context clearly indicates otherwise. The term "cluster," as used herein, is defined as two, or more than two. It will also be understood that, although the terms first, second, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

As used herein a "writable entity" (also referred to as a "live entity") may refer either to a main entity or to a clone and a "read-only entity" refers to snapshots.

As used herein, "a main entity" refers to either a filesystem, a file or a block volume. "Snapshot" refers to a snapshot of the main entity or snapshot of a clone i.e. a file system snapshot, file snapshot or a block level snapshot of the volume respectively. "Clone" refers to a clone derived out of a snapshot, i.e. clone of a file, clone of a file system or a block level clone of the volume respectively.

In some implementations, the main entity, the clone, and the snapshot used herein refers to a storage representation of a virtual machine (VM) in a virtualized environment.

As used herein, "signatures" are cryptographic hashes of data units and sampled signatures are cryptographic hashes of sampled data units.

As used herein, "data units" refers to data blocks in a volume, data files in a file system, data objects in an object-based storage system, or any other unit of data used for storing data in a storage system.

As used herein, "lineage tree" is a visualization of the lineage information depicting relationship between a main entity, related snapshots and related clones. The terms lineage tree and lineage information have been used interchangeably.

In general, deduplication is performed on storage systems to reduce multiple instances of the same data and increase the effective storage capacity of the storage system. In distributed storage with multiple nodes, same data units may be present in multiple nodes. Further, the data present in multiple nodes may not be shared between the nodes. Hence, in some cases, deduplication performed at individual storage system may not be enough to confirm that the data has been deduplicated across the distributed storage. In addition, deduplication becomes more complex in the presence of shared snapshots and clones in the distributed storage system. Further, any movement of data across the nodes in the distributed storage should account for the deduplicable data shared between two nodes.

An example implementation relates to managing movement of data units in a cluster of nodes in a distributed storage system. A database is maintained at a central node for sampled data units received from the cluster of nodes. An entity array in a data structure of the database stores information related to a set of entities associated with the sampled data units. The set of entities may include writable entities and read-only entities. Each entity of the set of entities comprises ancestor data. The method includes maintaining lineage information for the set of entities at each node of the cluster of nodes and determining a data set for migration at a source node of the cluster of nodes using the lineage information. Further, the method includes determining a destination node in the cluster of nodes for migration of the data set. The destination node is selected from a cluster of nodes based on the amount of deduplicable data between the data set for migration at source node and destination node. This reduces the redundant copies of same data across the data storage.

Before describing migration and other applications based on lineage information, supporting architecture and data structure will first be described. Referring now to the figures, FIG. 1 illustrates a block diagram of a distributed storage system 100. The distributed storage system 100 includes a cluster of nodes (104, 102-1, 102-2 ... 102-N). In the cluster of nodes, a node is assigned as a central node 104. The central node 104 maintains a database 110 with sampled data units received from other nodes 102-1, 102-2 ... 102-N (collectively referred as nodes 102) of the cluster. The processor 106-1, 106-2 ... 106-N (collectively referred as processor 106) in the nodes 102 and the processor 120 of the central node 104 may be implemented as one or more microprocessors, microcomputers, microcontrollers, digital signal processors, central processing units, state machines, logic circuitries, and/or any devices that manipulate signals based on operational instructions.

The processor 120 may be configured to execute instructions 116 (i.e. programming or software code) stored in the machine-readable medium to perform the functions of the distributed storage system 100 as described herein. For example, the machine-readable medium 114 may include instructions 116 and 118. The instructions 116 when executed causes the processor 120 to maintain an entity array for a set of entities associated with sampled data units from the cluster of nodes 102. The instructions 118 when executed causes the processor 120 to maintain lineage information of the set of entities. Although FIG. shows only two instructions, it should be understood that several instructions may be stored in the machine-readable medium 114.

The storage device 108 may be any mass storage device. The mass storage device 108 may be a combination of different types of storage such as disks, flash memory, solid-state drives (SSDs), etc.

At the central node 104, the database 110 may include a data structure 112 to maintain information related to the sampled data units received from the nodes 102. The data structure 112 maintains information of sampled signatures in the set of entities in the cluster of nodes using a signature list and entity list. The signature list and entity list of the sampled data units may be implemented using a signature array and entity array. Details related to an example of the data structure 112, the entity array and signature array are described in detail in conjunction with FIGS. 2B, 3, 4, 5A, 5B and 5C.

Nodes in the Distributed Storage System 100

Figure 2A:
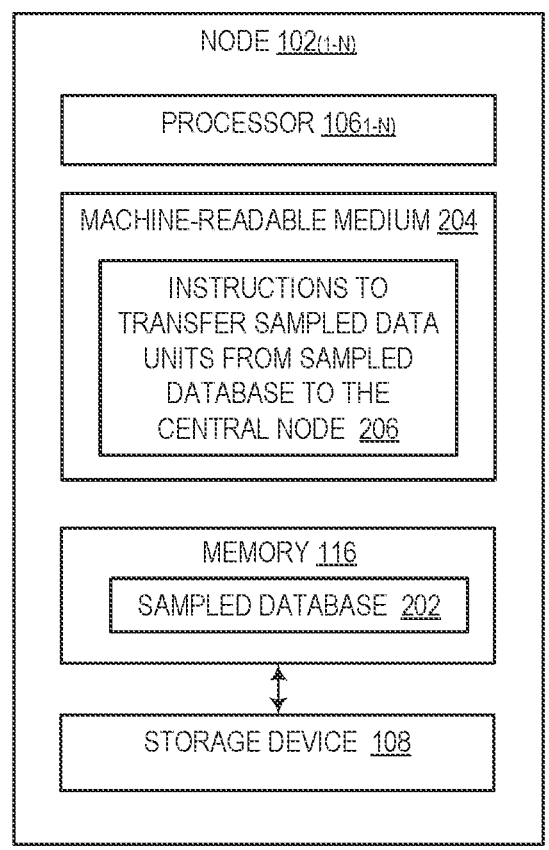
FIG. 2A illustrates components of nodes in the distributed storage system, in accordance with examples of the present disclosure.

FIG. 2A illustrates components of nodes 102 in the distributed storage system 100, in accordance with examples of the present disclosure. Each of nodes 102 in the distributed storage system 100 is a storage node. In an example, the storage node may be a physical server with one or more hard-disk drives (HDDs) or solid-state drives (SDDs). In another example, the storage node may be a virtual machine (VM) with access to one or more HDDs and/or SSDs. The node(s) 102 includes the processor(s) 106, a machine-readable medium 204, the storage device 108, and a sampled database 202 in a memory 116 of the node(s) 102.

The processor 106 is configured for storing and managing data present in the storage device 108 at the nodes 102. The processor(s) 106 of the nodes 102 is configured to manage the storage device 108 in the node 106 and transfer the sampled data units from the sampled database 202 to the central node.

The processor 106 may be configured to execute instructions (i.e. programming or software code) stored in the machine-readable medium 204 to perform the functions at node 106 as described herein. For example, the machine-readable medium 204 may include instructions 206. The instructions 206 when executed causes the processor 106 to transfer sampled data units from sampled database to the central node 104. Although FIG. 2A shows only one instructions, it should be understood that several instructions may be stored in the machine-readable medium 204.

The data units in the storage device 108 may be selectively sampled based on a sampling criteria. The data units meeting the sampling criteria are sampled and the information related to sampled data units is stored in the sampled database 202. The sampling may be performed during data ingest or by periodically scanning the storage device 108 for changes. In an example implementation, when a node is being initialized into the distributed storage 100 a sampled database 202 is created by sampling data present in the storage device 108. Once the sampled database 202 is created, the sampling is performed during data ingest on the storage device 108. The sampled database 202 may be continuously updated during data ingest to ensure that the database 110 may be queried to retrieve information. Data units (being written or rewritten) matching the sampling criteria are continuously sampled during data ingest. Further, the information in the sampled database 202 is updated based on the changes in the sampled data units during I/O operations.

The processor 106 may be configured to execute instructions (i.e. programming or software code) stored in the machine-readable medium 114 to perform the functions of the storage subsystem as described herein. For example, the machine readable medium 204 may include instructions 206 to transfer the sampled data units from the sampled database 202 to the central node 104.

In an embodiment, sampled signatures related to the sampled data units may be stored in the sampled database 202. When the size of the sampled data units in the sampled database 202 at the node 102 exceeds a pre-defined threshold, the contents of the sampled database 202 may be sent to the central node 104. In an example implementation, the data from the sampled database 202 may be sent to the central node when a query related to the node 102 is received at the central node 104. In an alternate embodiment, the nodes 102 may send the sampled data units from the sampled database 202 periodically to the central node 104.

Figure 2B:
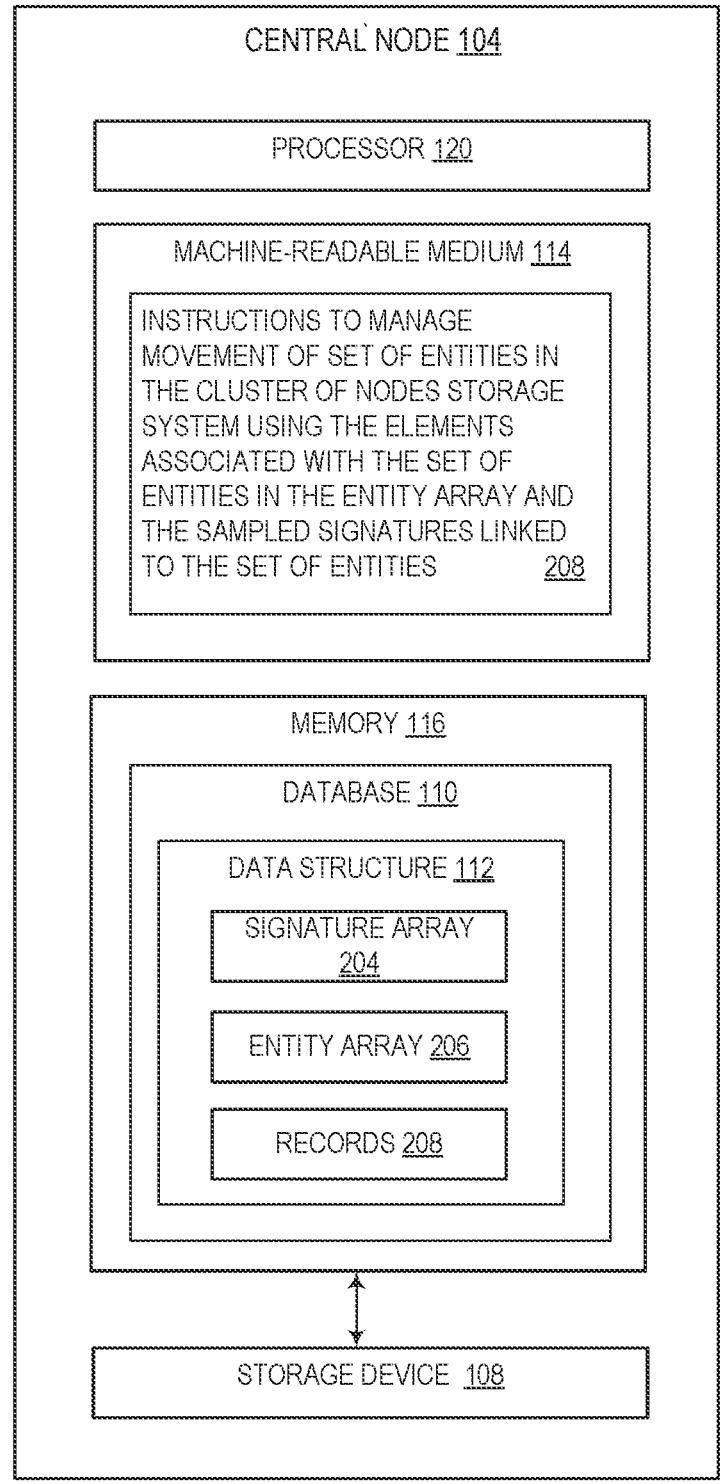
FIG. 2B illustrates components of a central node in the distributed storage system, in accordance with examples of the present disclosure.

Referring now to FIG. 2B, the central node 104 includes the processor 120, a machine-readable medium 114, the storage device 108, and a database 110 in a memory 116. The central node 104 may be one of the nodes of the distributed storage system 100. In an example implementation, the database 110 may be generated in the memory 116 of the central node 104 for sampled data units received from the cluster of nodes 102. The database 110 is a single unified database with data from the cluster of nodes 102.

The processor 120 may be configured to execute instructions (i.e. programming or software code) stored in the machine-readable medium 114 to perform the functions of the distributed storage system 100 as described herein. For example, the machine-readable medium 114 may include instructions 208. The instructions 208 when executed causes the processor 120 to manage movement of set of entities in the cluster of nodes storage system using the elements associated with the set of entities in the entity array and the sampled signatures linked to the set of entities. Although FIG. 2B shows only one instruction, it should be understood that several instructions may be stored in the machine-readable medium 114.

The database 110 may receive queries related to determining a data set on a source node for migration and a destination node for transferring the data set. In an example, the queries may be received from users (customers) storing data on the nodes 106 of the distributed storage system 100.

In an additional implementation, data received from the cluster of nodes 102 may be stored in a change log database (not shown in FIG. 2B) on the storage device 108. The change log database may be periodically consolidated and the changes may be applied to the data structure 112 using a background thread.

The data structure 112 maintains information related to the sampled data units received from the cluster of nodes 102. The signature array 204 may store a set of sampled signatures, associated with the sampled data units from the cluster of nodes 102. The set of sampled data units are associated with a set of entities stored in the entity array 206. The set of entities may include writable entities (i.e. main entities and clones) and read-only entities (i.e. snapshots of the main entity or snapshots of clones). The information received from the cluster of nodes 102 is stored using record 208 entries in the data structure 112. Each record may represent a sampled data unit connected to a sampled signature in the signature array 204 and an entity in the entity array 204 through signature-wise linked list and entity-wise linked list. For example, when the entity data is filesystem, each record may provide data associated with sampled data units of a file. The signature array 204 and the entity array 206 are updated based on changes in records 208 in the data structure 112.

The entity array 206 may maintain an ancestor data, a reference count associated with the ancestor data and a count of operations performed by each entity in the set of entities. In addition, each entity in the entity array 206 is associated with a node identity of the nodes 102 from which the sampled data unit was received. More details about the data structure 112, the signature array 204, and the entity array 206 and records 208 are explained in conjunction with the examples illustrated in FIGS. 3-5.

Although FIGS. 1 and 2B show that the data structure 112 maintained at a central node 104, in some implementations the data structure 112 may be replicated at multiple nodes 102 of the cluster to improve the availability of information of the sampled data units in the distributed storage system 100.

FIG. 3 illustrates an example of the data structure 112 on a database of the central node 104, in accordance with examples of the present disclosure. The data structure 112 stores sampled information from all the nodes of the distributed storage system 100. FIG. 3 shows the set of entities from two different nodes N1 and N2 in the cluster of nodes 102 in the entity array 206.

The signature array 204 maintains a set of sampled signatures associated with the set of sampled data units received from all the nodes 106 of the distributed storage 100. Each sampled signature may be associated with an index value, and each sampled signature is linked to an entity in the entity array using a record 208 in the data structure 112.

The entity array 206 maintains information related to each entity in the set of entities using elements 210. Each entity in the set of entities is linked to at least one sampled signature of the signature array 204. Each entity in the entity array 206 maintains several elements 210 including an ancestor data, a reference count associated with the ancestor data and a count of operations performed by respective set of entities. The reference count indicates the number of other entities referring to that entity. For example, in FIG. 3 each entity has elements including entity ID, ancestor data, reference count, node ID, a count of Add operations ("#Adds"), and the slot ID. The slot ID (index) is a reference provided to each entity in the entity-wise linked list. In case an entity is deleted, the slot ID becomes free and may be reused. The entity E1S1 which is a first snapshot of main entity E1, has no ancestors (blank), the reference count is 2 which indicates that E1S1 is referenced by other entities including the main entity E1 and clone C1 of the main entity E1. The elements in the entity array 206 link to records 208 in the data structure 112 using slot ID. Each entity may generate its own entity-wise linked list. The count of operations in each entity comprises of a count of signature additions (#Adds) and a count of signature removals (#Removes). In an implementation, the count of operations may be tracked using only signature additions (#Adds). In another implementation, the count of operations may be tracked using signature removals (#Removes).

In an example, when the entity is a file system, each record 208 includes information of a file and its offset. The sampled signature and the associated file system (entity) is linked to the record 208 using signature-wise linked list and entity-wise linked list. In FIG. 3 each record 208 indicates the sampled signature and entity associated with a file and it offset in the distributed storage 100

The file may be shared between multiple entities which is reflected using the ancestor data. Each record 208 may be an Add record or a Remove record. Add record indicates addition of a signature and Remove record indicates removal of a signature. Each record 208 in the data structure 112 depicted in FIG. is represented using a file and its offset. It also has Slot ID. The slot ID is the same as the slot ID of the associated entity. More details related to the records 208 and tracking is explained in below paragraphs in conjunction with FIGS. 5A, 5B and 5C Each sampled signature in the signature array 204 may create its own signature-wise linked list using the information present in the records 208. The signature-wise linked list of a signature includes all the records 208 which are linked to the sampled signature and may be used for tracking the entities in which the sampled signature is present. The entities associated with a sampled signature can be found using the signature-wise linked list of the sampled signature. For example, the signature-wise linked list of Sig-1 may identify that Sig-1 is present in entity E1S1 (in File F1, Offset OF1), Clone C1 (in File F1, Offset OF3) and entity E2 in (in File F3, Offset OF1). The identification of entities may be done using the records 208 linked to the Sig-1. For example, the records, 208-1, 208-6 and 208-7 are linked to Sig-1. Based on the slot ID present in these records the entities associated with the Sig-1 may be identified.

Further, based on the ancestor information in the entity array 206 of the identified entities, the Sig-1 is also present in the main entity E1. The records of E1S1 are being shared between E1S1 and E1. More details regarding record sharing is explained in conjunction with FIGS. 5A and 5B described below.

Each entity may generate its own entity-wise linked list. The entity-wise linked list may be used for tracking sampled signatures belonging to entity. For example, the entity-wise linked list of main entity E1 includes the records (208-4, 208-5) of entity E1 and records 208-1, 208-2 and 208-3 of E1S1. The records of E1S1 are shared with E1 as E1S1 is the ancestor for E1. Each of these records are linked to a sampled signature in the signature array. The records 208 (1-5) may be searched in signature wised linked list to track the sampled signatures associated with the entity E1.

The signature array 204 and the entity array 206 are updated based on changes in records 208 in the data structure 112. Each operation is recorded using Add record (addition of signature) and Remove record (removal or overwriting (change) of a signature). A remove record 208 indicates removal of a sampled signature due to deletion of entity or a change in an existing sampled signature.

The entity-wise linked list and signature-wise linked list may be traversed based on a query received at the database 110.

Each record in data structure 112 is linked to the signature-wise and entity-wise linked list of a sampled signature and an entity. The record may include signature-wise next pointer, signature-wise previous pointer, and entity-wise next pointer. These pointers allow easy walk through of the data structure 112 to retrieve information. Based on received query, information may be retrieved by walking through the signature-wise list or entity-wise list.

Lineage Tree

The set of entities in the entity array 206 are linked to each other and form a lineage in the order they were created. Lineage information present in the entity array may be visualized as a lineage tree. The lineage information depicts a relationship between a main entity, related snapshots and related clones.

Figure 4:
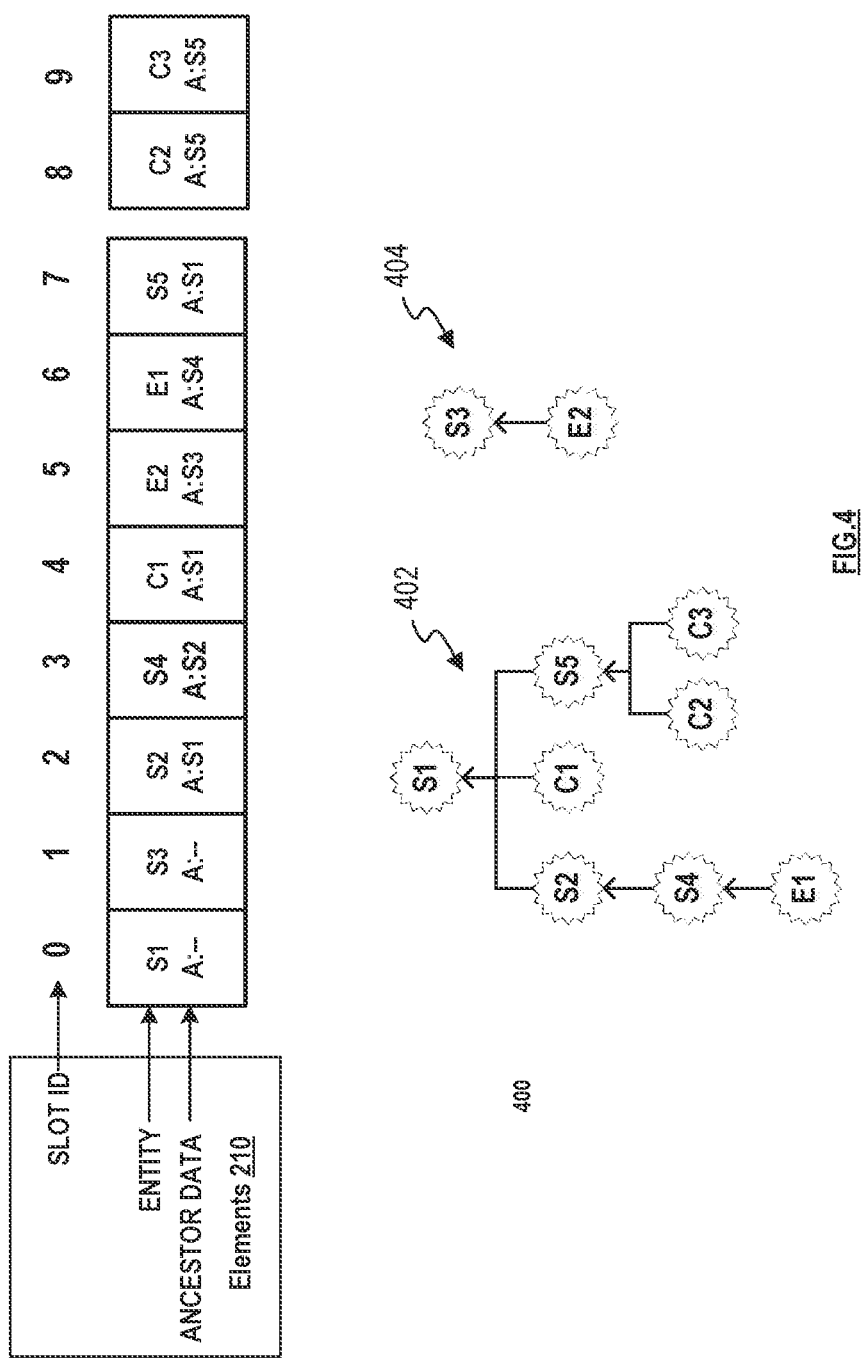
FIG. 4 depicts a lineage tree generated using information in the entity array, in accordance with examples of the present disclosure.

Each lineage tree may be associated with a main entity, the snapshots of the main entity and clones of the main entity. The number of lineage trees at the database 112 depends on the number of live entities present in the cluster of nodes 102. Referring now to FIG. 4, two lineage trees 402 and 404 generated for main entities E1 and E2 from the lineage information available in the entity array 206 are depicted. In addition, FIG. 4 shows the elements 210 including node ID, Slot ID, entity, and ancestor data associated with each entity in the data structure 110. In the lineage tree, the writable entities (main entity and clones) are present at the leaf nodes of the lineage tree and the read-only entities are present at the intermediate nodes. In FIG. 4, the entities E1, C1, C2, C3 and E2 are leaf nodes and the snapshots S1, S2, S4, S5 and S3 are intermediate nodes or root nodes.

Snapshot/Clone Creation

Various operations performed by the set of entities may include addition of a new sampled signature, a removal of a sampled signature, a deletion of snapshot of the main entity, a deletion of the main entity and a deletion of clone.

Figure 5A:
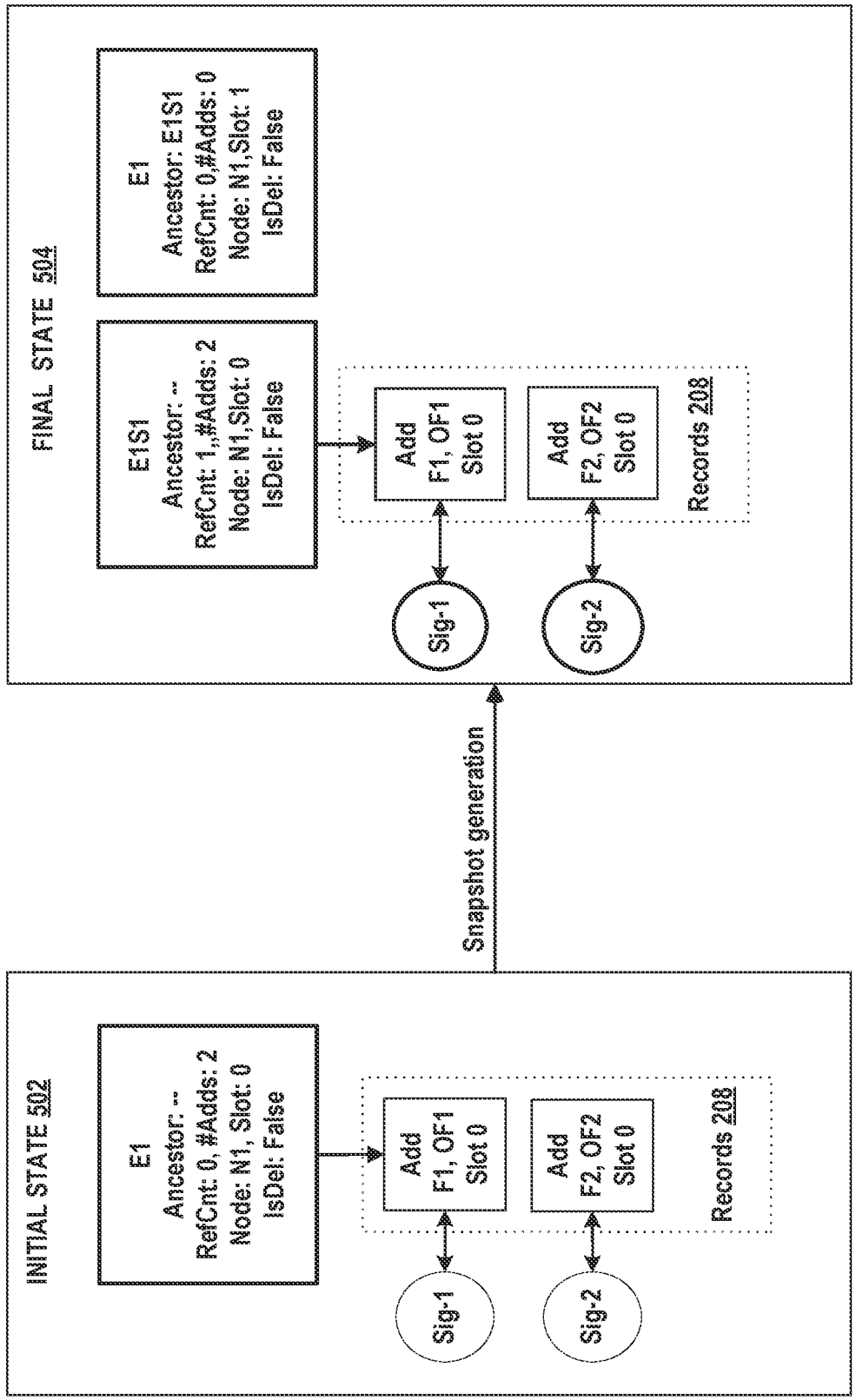
FIGS. 5A, 5B and 5C are example visualizations of the states of the data structure during operations performed by the set of entities.
Figure 5B:
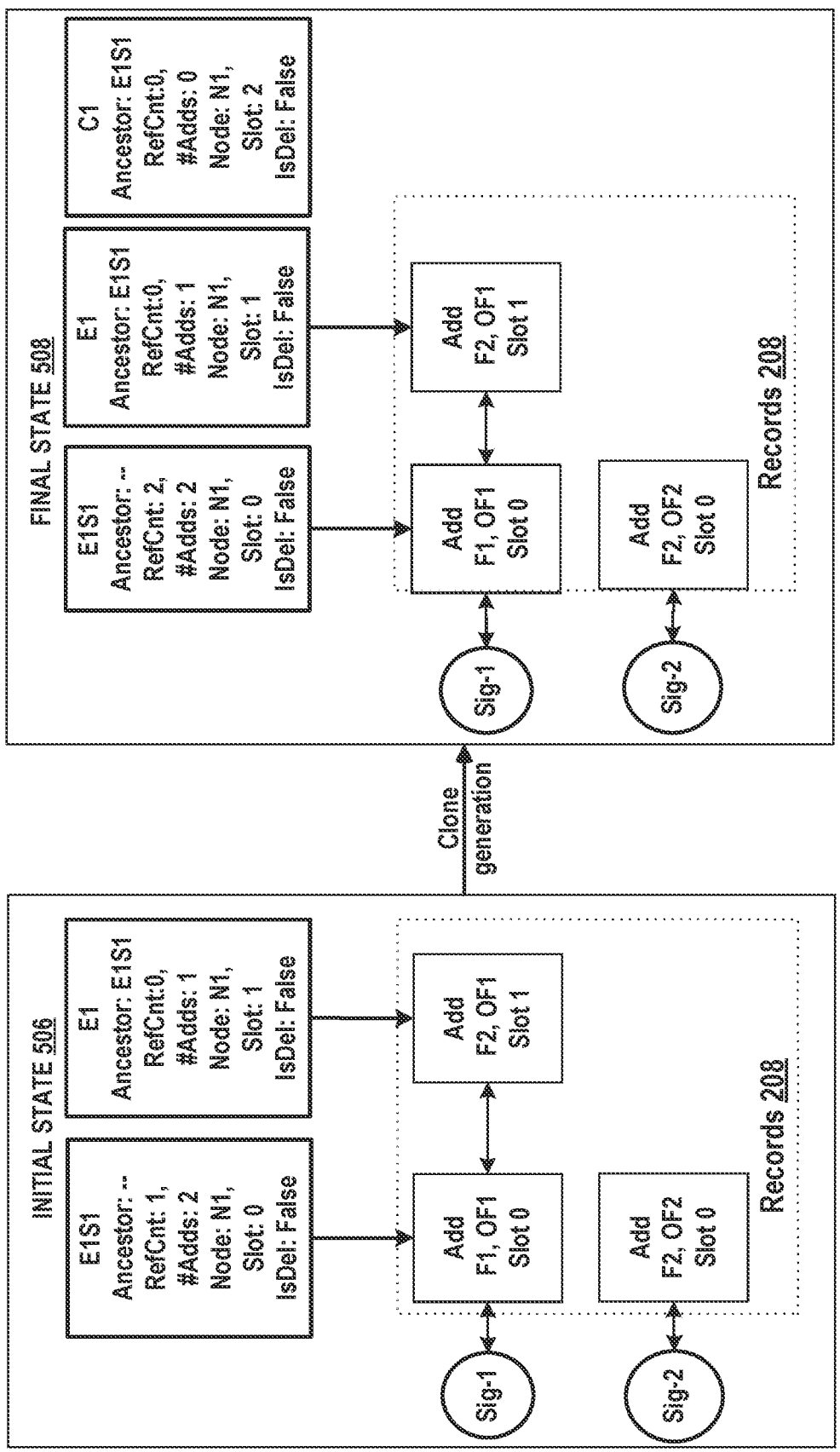

On creation of a snapshot of the main entity or creation of a clone created from a snapshot, the ancestor data of the main entity and clone are updated. In addition, a slot ID in the data structure 112 is allocated for the created snapshot and clone. FIGS. 5A and 5B are example visualizations of the states of data structure 112 during generation of snapshots and clones. In FIG. 5A, a main entity E1 is shown in the initial state 502 of the data structure 112. When a snapshot E1S1 is generated from the main entity E1, the records 208 associated with the main entity E1 are transferred to the snapshot E1S1, and the snapshot E1S1 is added as an ancestor to the main entity E1 in the final state 504 of the data structure 112. The ancestor data E1S1 indicates that all the records 208 are being shared between E1 and E1S1 currently. The reference count of E1S1 is incremented to 1. The reference count indicates that the snapshot is referenced by the main entity E1. If a clone C1 is subsequently generated from the main entity E1, the reference count of the snapshot E1S1 is incremented as both the generated clone C1 and main entity E1 refer to the snapshot E1S1 as its ancestor in the data structure 112. The records of E1S1 are then shared between E1, E1S1 and C1. In case there are changes in the sampled data units in E1, E1S1 and C1, a remove record entry may be used to indicate the change. For example, in case a sampled data unit is deleted from E1, a record is created under E1 indicating the file associated with the sampled data units and its offset. The remove record includes the entity, file, offset file is deleted. For example, when a File F2 and offset OF2 associated with Sig-2 is deleted from entity E1, a record is created for the removal of Sig-2 from entity E1.

In addition, the former slot ID of the main entity E1 is assigned to snapshot E1S1, and a new slot ID is provided for the main entity E1. In FIG. 5A, it can be seen that in the final state 504 the main entity E1 has a new slot ID "1" assigned to it, and the existing slot ID "0" is assigned to the snapshot E1S1. The slot ID may be used to identify the entity associated with a record in the data structure 112.

The records 208 associated with the main entity E1 are shared between the entity E1 and the snapshot E1S1. If a clone is generated from the snapshot E1S1 it may also share the records and have snapshot E1S1 as its ancestor. To indicate the presence or absence of a sampled signature in the set of entities, each record 208 is marked with Add or Remove.

In FIG. 5A, a main entity E1 is shown in the initial state 502 of the data structure 112. When a snapshot E1S1 is generated from the main entity E1, the records 208 associated with the main entity E1 are transferred to the snapshot E1S1, and the snapshot E1S1 is added as an ancestor to the main entity E1 in the final state 504 of the data structure 112. The reference count of E1S1 is incremented to 1.

In FIG. 5B, a main entity E1 and a snapshot E1S1 of the main entity E1 in the initial state 506 of the data structure 112. When a clone C1 is generated from the snapshot E1S1, a new slot ID (slot ID 2) is assigned for the clone C1 in the final state 508 of the data structure 112. The ancestor data for C1 is updated to E1S1 and the reference count of E1S1 is incremented to 2. The reference count of E1S1 indicates that E1S1 is referenced by two other entities. E1S1 is the ancestor for the main entity E1 and the clone C1. Although not shown, the ancestor data of E1S1 indicates that all the records are being shared between E1, 01 and E1S1 in the final state 508.

Addition of Signature

Any changes on the snapshot E1S1 and clone C1 may be tracked by adding new record entries in the data structure 112. In addition, any change of a sampled signature associated with the E1S1 and C1 may be tracked using record entries. For any operation performed by the writable entities, a record is created in the data structure 112. In case of change (overwriting) in the sampled signature of an entity, the count of operations (Add) is updated in the entity array 206 for the respective entity. The change may be a new sampled signature which may be added to the signature array 204. Although FIGS. 3, 5A and 5B show the number of Adds as the count of operation, it should be understood that the number of removals may also be an element in each entity of the entity array 206.

Removal of Signature

When a file is deleted, all the records in the entity-wise list is traversed and any record matching the file and offset criteria in the ancestor of the entity is removed from the first data structure 112. A remove record is added in the data structure 112 to indicate the removal of the data unit when the sampled data units associated are shared with other entities.

Figure 5C:
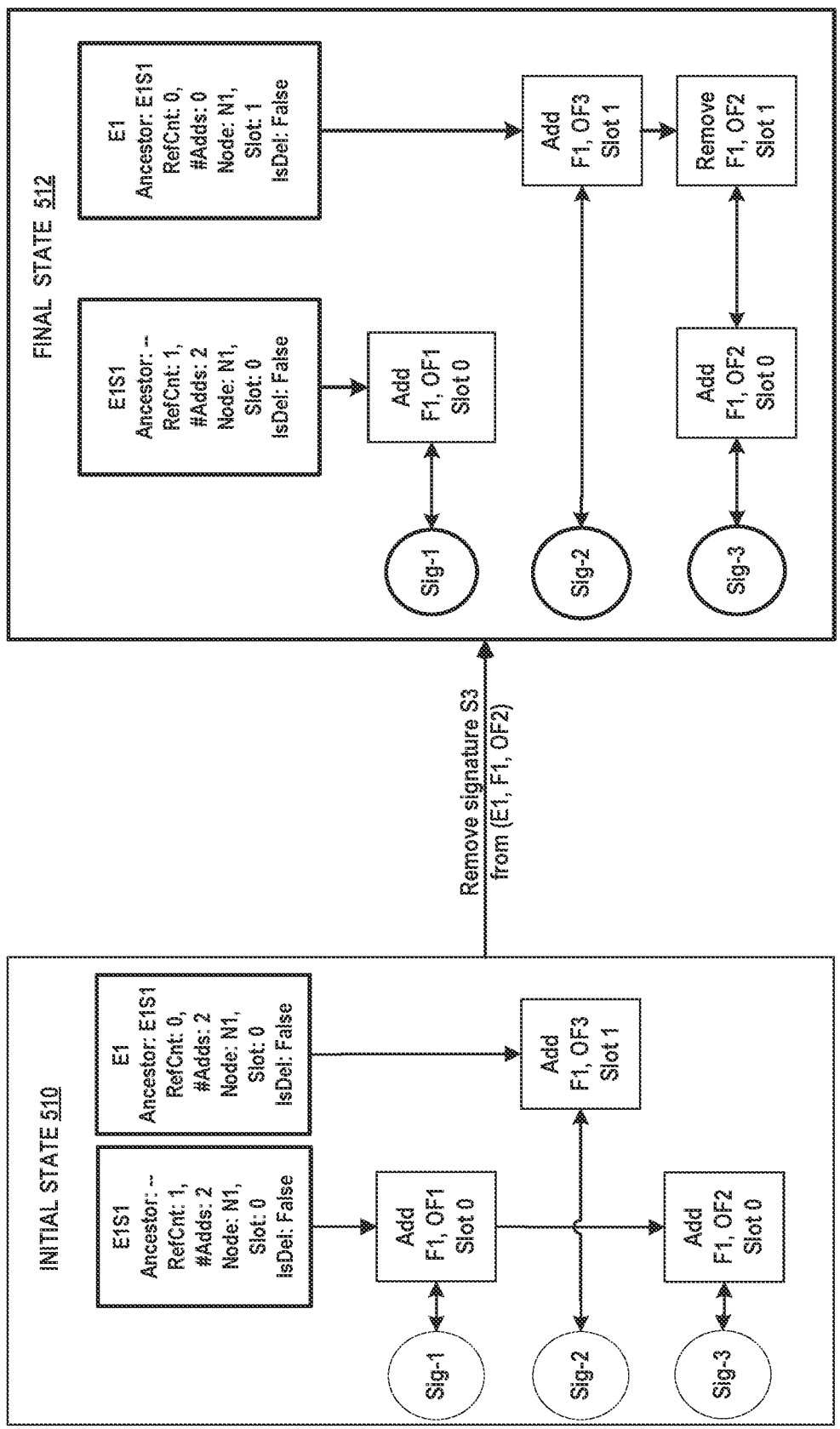

FIG. 5C is an example visualization of the states of data structure during an operation in which a signature from file is removed. In FIG. 5C, a main entity E1 and its snapshot is shown in in the initial state 510 of the data structure 112. When a signature S3 is removed from file F1, offset OF2 of entity E1, a remove record is entered in the data structure 112. The final state 512 shows the remove record indicating removal of the signature S3 from file F1 of entity E1.

Although the examples and description disclose clones derived from snapshots, it should be understood that clones also can be generated from main entity.

Figure 6:
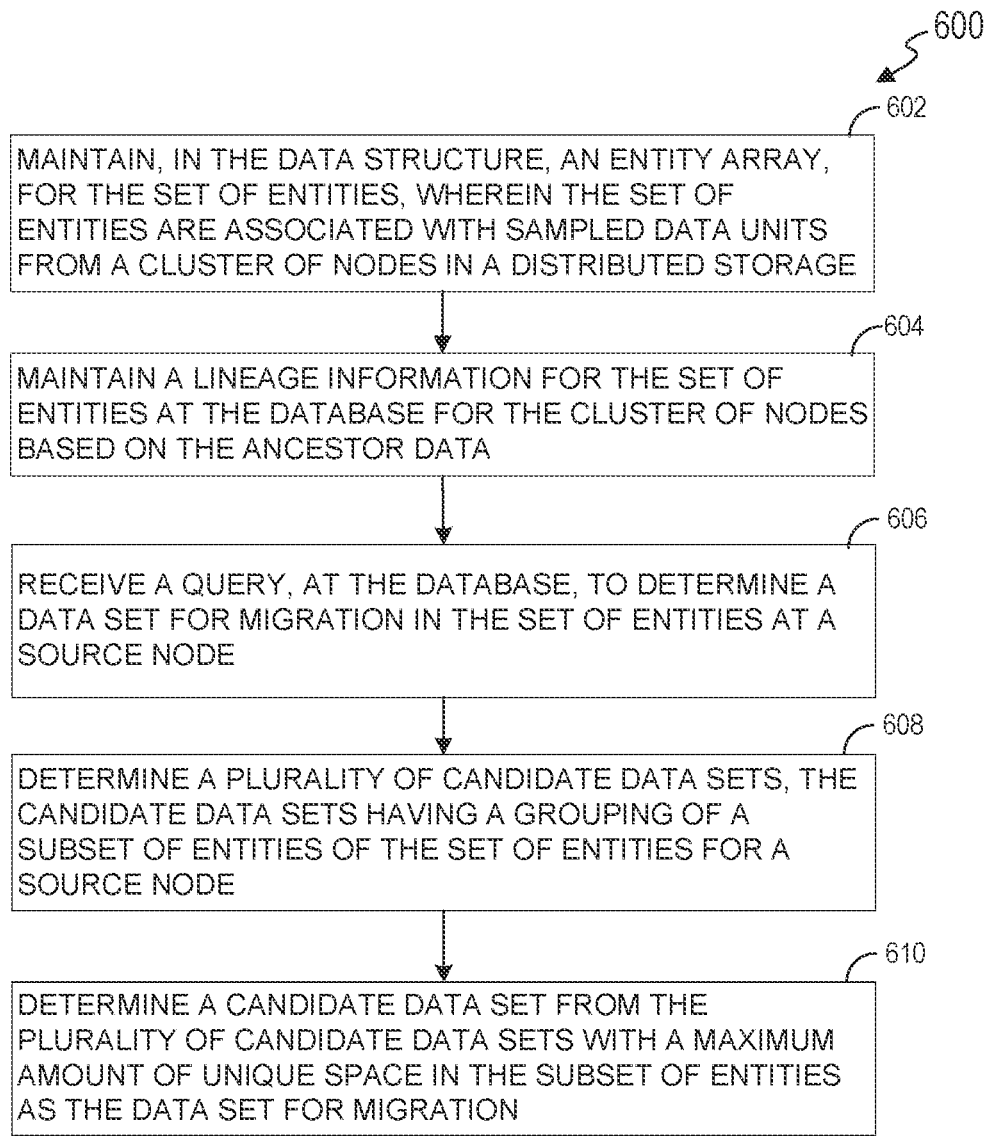
FIG. 6 is a flow diagram depicting a method of determining a data set for migration from a source node, in accordance with examples of the present disclosure.
Figure 8:
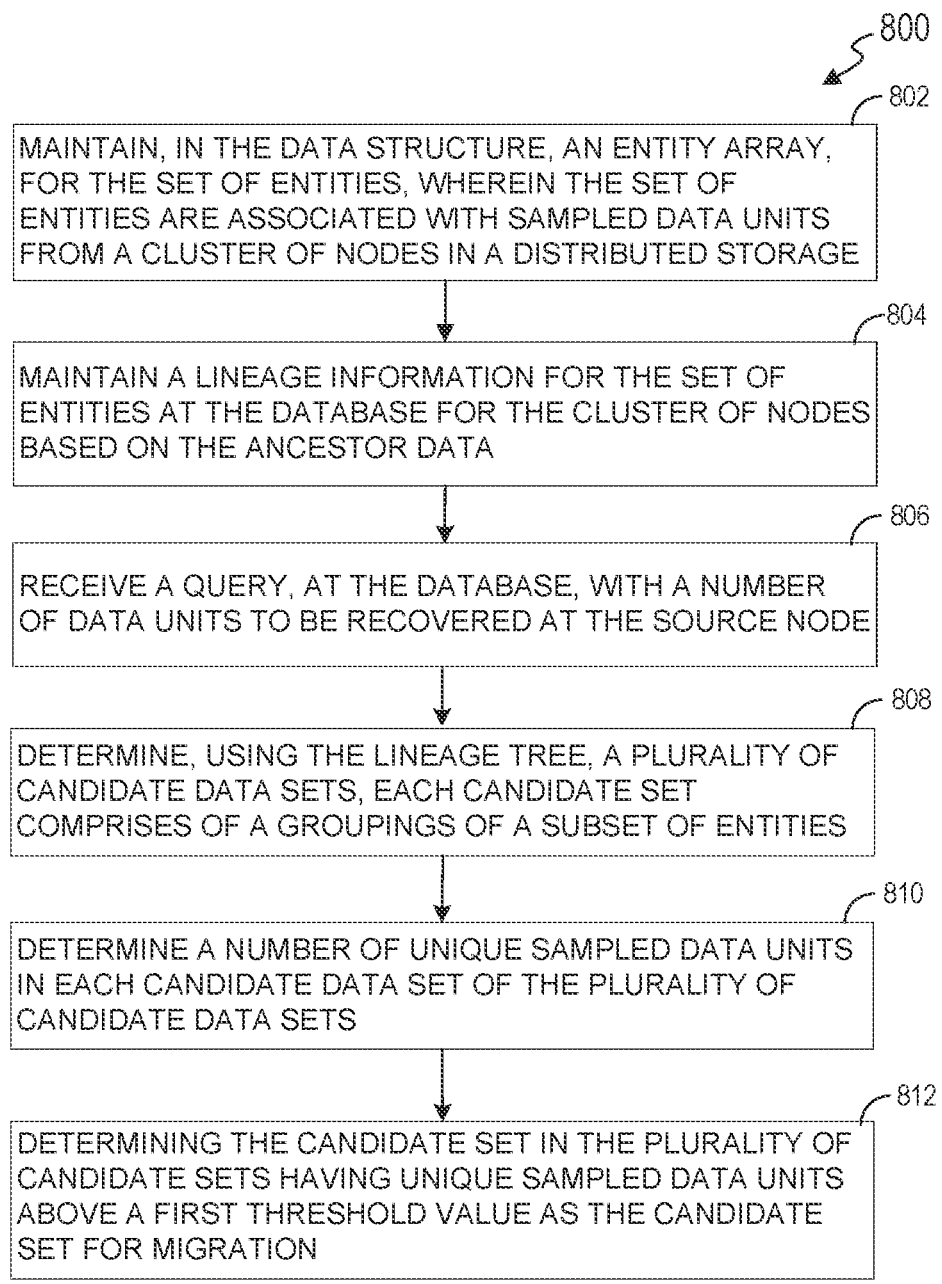
FIG. 8 is a flow diagram depicting a method of determining a data set for migration from the source, in accordance with examples of the present disclosure.

FIGS. 6 and 8 are flow diagrams depicting various example methods for determining a data set for migration for a source node. In some implementations, one or more blocks of the methods may be executed substantially concurrently or in a different order than shown. In some implementations, a method may include more or fewer blocks than are shown. In some implementations, one or more of the blocks of a method may, at certain times, be ongoing and/or may repeat. In some implementations, blocks of the methods may be combined.

The methods (600, 800) shown in FIGS. 6 and 8 may be implemented in the form of executable instructions stored on a machine-readable medium (such as machine-readable medium 114) and executed by a processing resource (e.g. such as processor 120) and/or in the form of electronic circuitry at the central node 104.

The method 600 may start in block 602, where an entity array 204 is maintained in the data structure 112 of the database 100 for a set of entities. The set of entities may be associated with sampled data units from a cluster of nodes of the distributed storage system 100. The set of entities may include read-only entities and writable entities. The read-only entities may be snapshots of main entities, and the writable entities may be main entities or clones generated from the snapshots.

Each entity in the entity array 206 includes elements 210 indicating ancestor data and a reference count associated with the ancestor data. The elements 210 in the entity array 206 are maintained for each entity and define the metadata of the entity.

At block 604, the method 600 includes maintaining a lineage information for the set of entities at the database for the cluster of nodes 102 based on the ancestor data maintained in the entity array 204. The lineage information is automatically maintained in the database for the set of entities in the cluster of nodes 102 based on the information in the entity array 206.

At block 606, the method 600 includes receiving a query at the database 110 to determine a data set for migration among set of entities at a source node from the cluster of nodes 102.

At block 608, the method 600 includes determining, using the lineage information, a plurality of candidate data sets for a source node. The lineage information includes the lineage between a main entity, related snapshots and related clones in a set of entities. To determine the plurality of candidate sets a group of writable entities (main entity or clones) at leaf nodes and read-only entities (snapshots) at intermediate nodes may be grouped together until branching points are encountered in the lineage tree. The branching points may be identified based on the reference count of the snapshots in the set of entities. Any snapshot with a reference count greater than one indicates a branching point in the lineage tree. Each grouping of the leaf node and intermediate nodes till the branching point is considered as a candidate data set. The subset of entities from the leaf node (clone or main entity) to intermediate nodes may be combined until the branching point to form candidate data sets. The subset of entities in the candidate data set include unique sampled data units which are not shared with any other candidate data sets.

For example, in the first lineage tree 702 in FIG. 7, the reference count of entity S3 is three, indicating a branching point in the lineage tree 702. In addition to entity S3, the entity S8 of the subset of entities in lineage tree 702 has reference count of 2 indicating an additional branching point. The subset of entities from the leaf node up to the branching point may be grouped together as they share unique sampled data units which are not shared with any other candidate data sets.

At block 610, the method 600 includes determining a candidate data set from the plurality of candidate data sets with a maximum amount of unique space in the subset of entities as the data set for migration.

The migration of subset of entities in a candidate set moves both the unique sampled data units and shared sampled data units. Any shared sampled data units remain on the source node, i.e., a copy of the shared sampled data unit is retained on the source node. Hence, while migrating entities from source node, it is preferred that the subset of entities sharing maximum amount of unique data is migrated together from the source node to recover maximum space at the source node.

The unique sampled data units in each candidate data set may occupy a specific storage space on the source node. The candidate data set occupying maximum unique storage space on the source node is selected as the data set for migration as it can recover a maximum amount of space at the source node.

The sampled data units in the data set for migration may be scaled up using a scaling factor to determine the estimate of actual amount of space freed at the source node.

Referring now to FIG. 7, two different visualizations of the lineage information in the set of entities on the source node in the form of lineage tree are depicted. A first lineage tree 702 is for a set of entities (main entity, snapshots and clones) related to main entity E1, and the second lineage tree 704 is for set of entities (main entity, snapshots and clones) related to main entity E2 at a source node. The lineage information of the set of entities may be seen from each lineage tree.

In FIG. 7, the first lineage tree 702 shows a plurality of candidate data sets. The reference count associated with each entity may be used for identifying the branching point to determine the grouping of subset on entities. For example, the reference count of entity S3 is three, indicating a branching point in the lineage tree. In addition to entity S3, the entity S8 of the subset of entities in lineage tree has reference count of 2 indicating an additional branching point. The subset of entities after the branching point may be grouped together as they share unique sampled data units which are not shared with any other candidate data sets. The subset of entities after the branching point form a shared snapshot set. S1, S2 and S3 form a shared snapshot set. S10 and S11 for another shared snapshot set. The subset of entities in the shared snapshots may not have any unique data units as they are sharing the sampled data units with snapshots after the branching point.

E1, S6, S5, and S4 form a candidate data set. 01 and S7 form a candidate data set. C2 and S9 form a candidate and C3 and S10 form a candidate data set. In an example, the candidate data set may include a grouping of snapshots with the main entity (E1, S6, S5, and S4) and the candidate data set may include a grouping of snapshots and clones (C2 and S9, C3 and S10).

In an example implementation, a migration from the source node may be initiated by a user for recovering a specific amount of storage on the source node. FIG. 8 depicts a method of determining the data set for migration when a specific amount of storage on the source need is to be recovered at the source node. The blocks 802, 804, 806, and 808 are similar to blocks 602, 604, 606, and 608. At block 806, the query received may specify the number of data units to be recovered at the source node.

Figure 9:
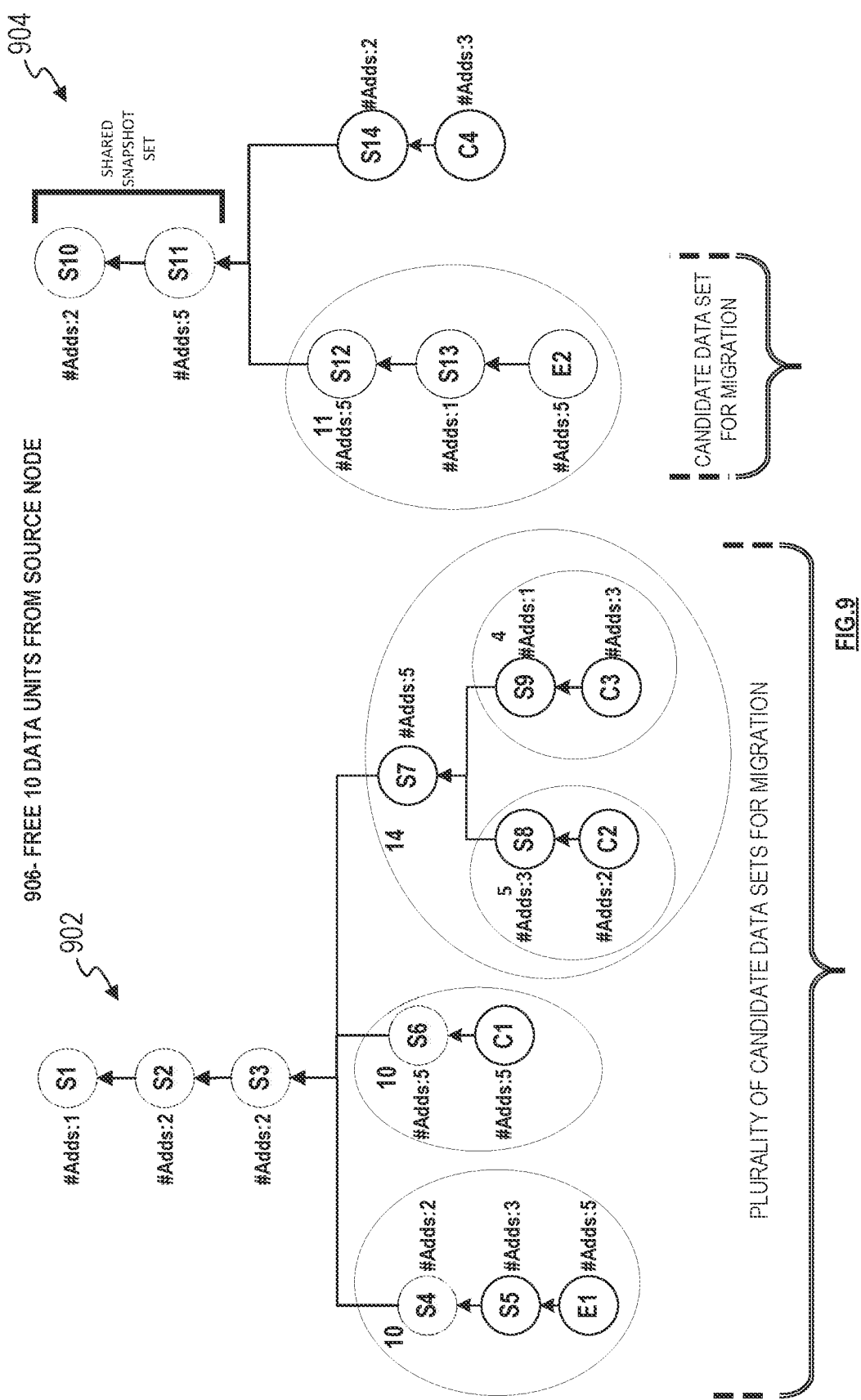
FIG. 9 depicts examples of lineage trees for determining the candidate data set for migration.

At block 810, the method 800 includes determining a number of unique sampled data units in each candidate data set of the plurality of candidate data sets. The method 800 will be described further herein below with reference to the example illustrated in FIG. 9. Similar to FIG. 7, FIG. 9 shows two different lineage trees generated for the set of entities at the source node (i.e., the entities in entity array 206). A first lineage tree 902 is for a set of entities (main entity, snapshots and clones) related to main entity E1, and the second lineage tree 904 is for a set of entities (main entity, snapshots and clones) related to main entity E2.

The number of #Adds (the sum of #Adds) in the lineage tree may be used for determining the plurality of candidate data sets The #Adds associated with each entity may be considering for determining the sum of #Adds in a grouping of subset of entities in the lineage tree. Referring now to FIG. 9, a query 906 may specify that ten data units are to be freed at the source node. The #Adds associated with each entity from the entity array 206 is shown next to entity for reference. When ten data units are to be freed at the source node, then starting at the leaf node and going up, the #Adds associated with writable entity at leaf nodes is added with the #Adds of the snapshots in the lineage tree until the specific amount data units (e.g., ten) is reached.

Combining the #Adds of E1, S5 and S4 of lineage tree 902 results in a candidate data set which may free ten data units from the source node. The #Adds combined for C1 and S6 may free ten data units from the source node. In some cases, two or more candidate data sets may be combined to generate a candidate data set to meet the required amount of data units to be recovered. For example, the #Adds combined for C2, S8, may free 5 data units, the #Adds combined for C3, and S9 may free 4 data units, S7 is shared between C2, S8 and C3, S9 and S7. The #Adds of S7 is 5. Hence a candidate set can be formed by combining the #Adds of S7 with C2, S8, S9 and C3 resulting in freeing fourteen data units. The #Adds combined for E2, S12 and S13 may free 11 data units from the source node.

In FIG. 9, the #Adds of the leaf node C4 and the next node S14 of entity E2 may not be considered as a candidate data set, because the sum of #Adds is five, which is less that the amount of space to be recovered.

The #Adds associated with subset of entities may or may not represent unique sampled data units as they may be shared with other sampled data units. The #Adds of each entity may be considered as the upper bound in the unique sampled data units in the entity. When the candidate data set is selected at the source node, the sampled data units for transfer may include shared sampled data units with other candidate data sets. Both the sampled data units are considered for migration.

In an example implementation, both of #Adds and #Removes associated with each entity may be considered. Considering both the #Adds and #Removes may provide a more accurate representation of the total number of sampled data units which need to be migrated can be considered.

In an embodiment, additional data structures may be used to identify the plurality of candidate data sets and the shared snapshots using the entity array and specifically the number of #Adds and #Removes in each candidate data set.

At block 812, the method 800 includes determining the candidate data set in the plurality of candidate data sets with unique sampled data units above a threshold as the candidate data set for migration. The threshold may be a value of number of data units to be recovered at the source node. In an example, the threshold is updated based on the query. The query may include the number of data units to be recovered.

In addition to considering the data units to be recovered, the amount of unique space occupied by subset of entities in each candidate date set on the source node may be considered.

Although the methods 600 and 800 describe processing a query to determine the data set for migration from the source node, and the method 1000 describes a method to select a destination node, it should be understood that the data structure 112 may be used for processing queries related to determining unique space in specific entities at nodes 102, unique snapshots at nodes 102, and change rate of a set of entities at a nodes 102 etc.

Figure 10:
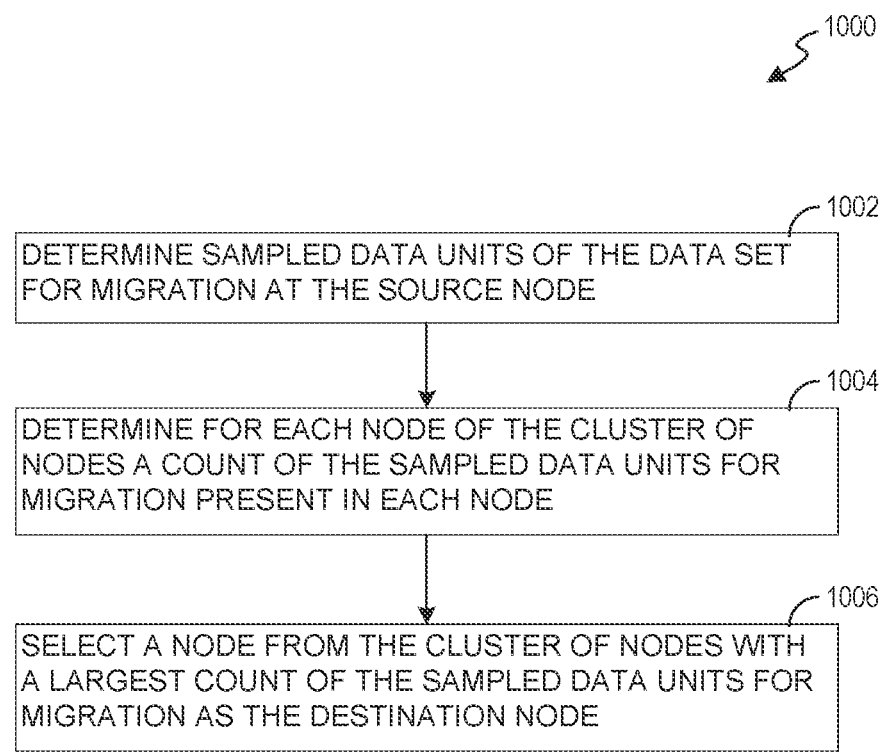
FIG. 10 is a flow diagram depicting a method for determining a destination node for migration of the data set, in accordance with examples of the present disclosure.

In distributed storage systems, it may be useful to move the data set selected for migration to a destination node that has maximal sharing of the sampled signatures of the selected data set. This would maximize the overall deduplication efficiency of the distributed storage system 100. FIG. 10 is a flow diagram depicting a method 1000 for determining the destination node for migration of the data set from a source node. In some implementations, some or all of the steps of method 1000 may be implemented by a processor 120 executing instructions that are stored in a machine-readable medium 114.

The method 1000 begins at block 1002 by determining sampled data units of the data set for migration at the source node (e.g., the data set for migration may be determined by performing methods 600 or 800 described above).

The sampled data units for migration comprises of unique sampled data units and other shared sampled data units. During migration, besides the unique sampled data units present in the data set for migration, the other sampled data units in the subset of entities which are being shared with ancestor snapshots may be migrated. The shared sampled data units are the sampled data units that are being shared between the subset of entities in the data set for migration and other entities (shared snapshots) in the lineage tree. For example, in FIG. 9, the total #Adds of the subset of entities (E1, S5 and S4) in a candidate data set has 10 unique sampled data units among each other. However, there may be a possibility that besides the 10 sampled data units, there may be additional sampled data units in E1, S5 and S4 that are shared with the shared snapshot (S1, S2 and S3). If the unique sampled data units from subset of entities E1, S5 and S4 are being migrated, the number of sampled data units for migration includes the unique sampled data units of E1, S5 and S4 and the shared sampled data units between the data set (E1, S5 and S4) and shared snapshot (S1, S2 and S3).

The sampled data units may be determined by walking through the signature array 204 of the data structure 112 record by record. In an implementation, the determination of the sampled data units may be done by finding the presence of sampled signature based on the information available in the record entries in the data structure 112. Based on the Add or Remove indicated in the record 208, the presence or absence of a signature associated with the entity can be identified.

In an implementation, additional data structures may be used for retrieving information about the signatures and entities by walking through the entity-wise linked list maintained for an entity. For example, when a query is received for determining unique space occupied by a main entity E1, the entity-wise linked list of E1 and snapshots of E1 (E1S1) and clones are walked through in the data structure to determine the unique sampled data units.

At block 1004, the method 1000 includes determining, for each node of the cluster of nodes, a count of sampled data units for migration present in each node of the cluster of nodes 102. For each node of the cluster of nodes, the sampled data units of the node are compared with the sampled data units for migration determined at block 1002. Based on the comparison, a count of sampled data units present in each probable destination node in the cluster of nodes is computed. The count indicates the deduplicable sampled data units between the source node and probable destination nodes. In an example, the sampled signatures associated with the sampled data units for migration at the source node may be searched at each node of the cluster of nodes 102.

At block 1006, the method 1000 includes selecting a given node from the cluster of nodes 102 with a largest count of sampled data units for migration at the given node as the destination node. The largest count indicates that the destination node and source node share maximum deduplicable data between each other. This method of data set selection at source node and selection of destination node selection may be useful for improving space efficiency of the distributed storage system 100.

Although the methods 600, 800 and 1000 may be performed for migration related queries, it should be understood that the database 110 is capable of processing other queries such as determining entity change rate or determining the amount of unique sampled data units in snapshots. In addition, the database may support queries of different granulates. For example, if the entity is a filesystem, queries at a node level or filesystem level or file level can be processed.

Figure 11:
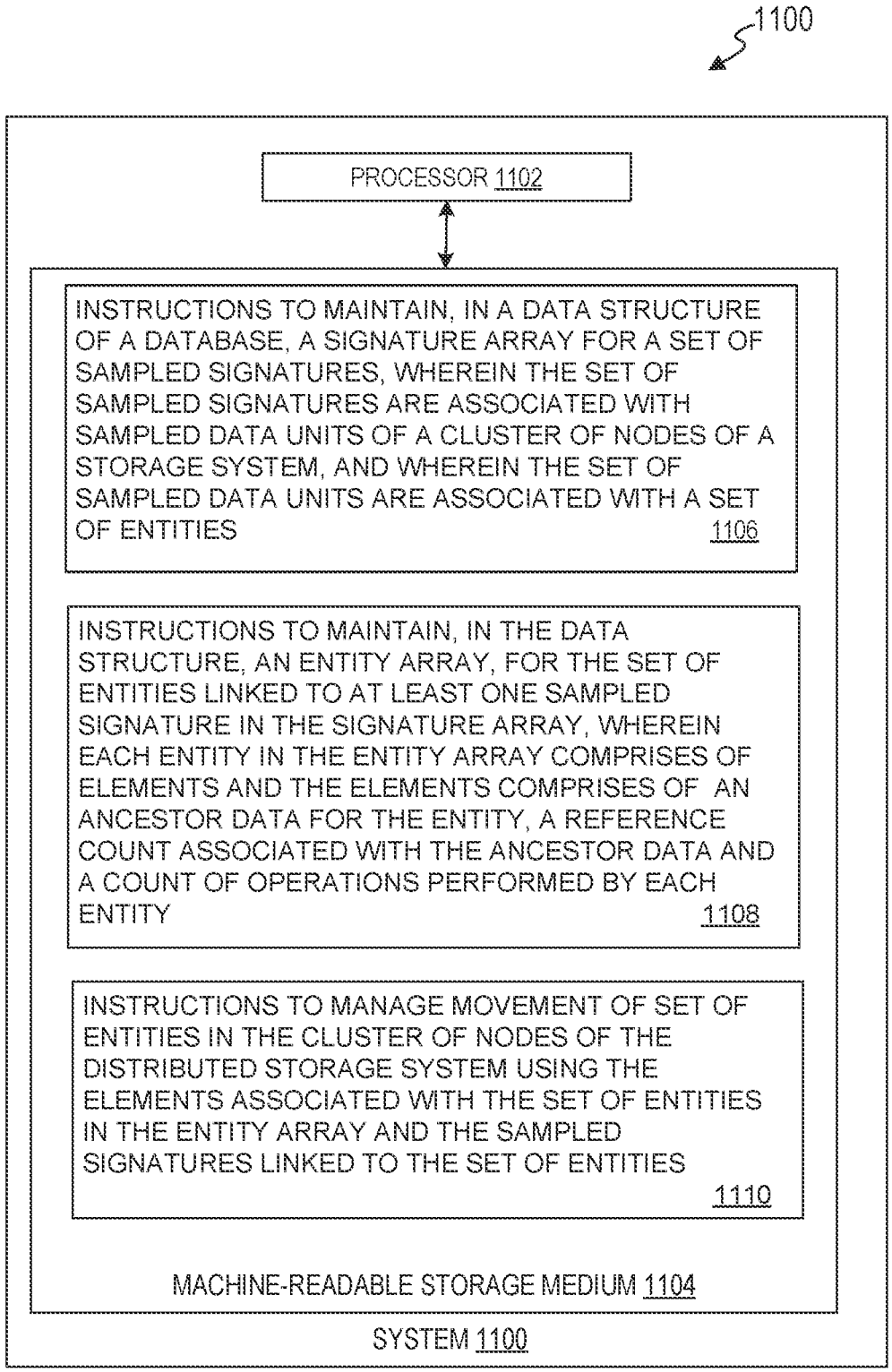
FIG. 11 illustrates an example computing environment, implementing a non-transitory computer-readable medium, according to an example of the present disclosure.

FIG. 11 illustrates an example computing environment 1100, implementing a machine-readable storage medium 1104, according to an example of the present disclosure. The machine-readable storage medium 1104 may be utilized by a computing system 1100, such as the distributed storage system. In one implementation, the computing environment 1100 may include the processor communicatively coupled to the machine-readable storage medium 1104 in the distributed storage system 1100. The machine-readable storage medium 1104 may be, for example, an internal memory device. In an implementation, the machine-readable storage medium 1104 includes a set of computer readable instructions, such as instructions corresponding to the database 110 of the central node 104.

The set of instructions (1106, 1108 and 1110) may be accessed by the processor 1102 and executed for managing the movement of sampled data units in the cluster of nodes of the distributed storage system 100.

For example, at block 1106, the instructions when executed causes the processor 1102 to maintain, in a data structure 112 of a database 110, information from the set of entities using an entity array 206 and signature array 204. The sampled signatures are associated with sampled data units of a cluster of nodes 102 of the distributed storage system 100. The sampled data units are associated with a set of entities in the cluster of nodes 102. Maintaining the set of sampled data units in a centralized manner allows faster decision making when processing queries received at the database 110.

At block 1108, the instructions when executed causes the processor 1102 to maintain, in the data structure 112, an entity list in the form of the entity array 206, for the set of entities. Each entity in the set of entities is linked to a sampled signature in the signature array 204. Each entity in the entity array includes metadata in the form of elements 210. For example, the elements may include an ancestor data for the entity, a reference count associated with the ancestor data and a count of operations performed by each entity. The set of entities may include writable entities (live entities) and read-only entities (snapshots).

At block 1110, the instructions when executed cause the processor to manage the movement of set of entities in the cluster of nodes of the distributed storage system using the elements 210 associated with the set of entities in the entity array 206 and the sampled signatures linked to the set of entities in the records 208 maintained in the data structure 112.

In the foregoing description, numerous details are set forth to provide an understanding of the subject matter disclosed herein. However, implementation be practiced without some or all of these details. Other implementations may include modifications, combinations, and variations from the details discussed above. It is intended that the following claims cover such modifications and variations.

We claim:
1. A method comprising:
maintaining, in a data structure of a database, an entity array for a plurality of entities, wherein the plurality of entities comprise writable entities and read-only entities and are associated with sampled data units from a cluster of nodes in a distributed storage, and wherein each corresponding entity of the plurality of entities comprises ancestor data indicating a presence of any relationship between the corresponding entity and another entity;
maintaining, in the database, lineage information of a group of entities of the plurality of entities based on the ancestor data, wherein the lineage information represents relationships among the entities of the group of entities, and the group of entities is on a first node of the cluster of nodes;
receiving, by a system comprising a hardware processor, a query to migrate data;
in response to the query:
determining a data set for migration from the first node to a destination node of the cluster of nodes, wherein the determining of the data set for migration is based on:
identifying, based on the lineage information, candidate data sets comprising a first candidate set including sampled data units of a first subset of entities from the group of entities, and a second candidate set including sampled data units of a second subset of entities from the group of entities, and selecting the data set from among the candidate data sets based on comparing amounts of storage space occupied in the first node by the first subset of entities and by the second subset of entities; and migrate, by the system, the data set from the first node to the destination node.

2. The method of claim 1, wherein the selecting of the data set from among the candidate data sets comprises:

determining which of the candidate data sets occupies a maximum amount of unique storage space consumed by unique sampled data units in respective candidate data sets, wherein the unique sampled data units of a candidate data set is not shared with any other candidate data set.

3. The method of claim 2, wherein the migrating of the data set moves unique sampled data units of the data set from the first node to the destination node and frees up storage space at the first node corresponding to the moved unique sampled data units of the data set.

4. The method of claim 3, wherein the data set for migration comprises of a grouping of writable entities and read-only entities, wherein the grouping of writable entities and read-only entities comprises at least one of a grouping of a main entity and snapshots of the main entity, or a grouping of clones and snapshots of the main entity.

5. The method of claim 3, wherein the migrating of the data set copies shared sampled data units of the data set from the first node to the destination node such that the shared sampled data units of the data set remain at the first node.

6. The method of claim 1, wherein the selecting of the data set from among the candidate data sets comprises:

determining a candidate data set of the candidate data sets with a quantity of unique sampled data units above a threshold quantity of data units.

7. The method of claim 1, wherein the query specifies a quantity of data units that are to be freed at the first node based on migrating data.

8. A non-transitory machine-readable storage medium comprising instructions executable by at least one processor to:

maintain, in a data structure of a database, a signature array comprising a plurality of sampled signatures associated with sampled data units of a cluster of nodes of a storage system, wherein the sampled data units are associated with a plurality of entities comprising writable entities and read-only entities;

maintain, in the data structure, an entity array for the plurality of entities, each entity of the plurality of entities linked to at least one sampled signature in the signature array, wherein each corresponding entity in the entity array comprises ancestor data indicating a presence of any relationship between the corresponding entity and another entity;

maintain, in the database, lineage information of a group of entities of the plurality of entities based on the ancestor data, wherein the lineage information represents relationships among the entities of the group of entities, and the group of entities is on a first node of the cluster of nodes;

receive a query to migrate data;

in response to the query:

determine a data set for migration from the first node to a destination node of the cluster of nodes, wherein the determining of the data set for migration is based on:

identifying, based on the lineage information, candidate data sets comprising a first candidate set including sampled data units of a first subset of entities from the group of entities, and a second candidate set including sampled data units of a second subset of entities from the group of entities, and selecting the data set from among the candidate data sets based on comparing amounts of storage space occupied in the first node by the first subset of entities and by the second subset of entities; and migrate the data set from the first node to the destination node.

9. The non-transitory machine-readable storage medium of claim 8, wherein the instructions are executable by the at least one processor to:

transfer records associated with a writable entity to a read-only entity when the read-only entity is generated, wherein the records associated with the writable entity are shared between the writable entity and the read-only entity; and add the read-only entity as an ancestor of the writable entity.

10. The non-transitory machine-readable storage medium of claim 8, wherein the instructions are executable by the at least one processor to:

identify the destination node as a node that shares the most sampled signatures with the data set for migration.

11. The non-transitory machine-readable storage medium of claim 8, wherein the instructions are executable by the at least one processor to determine which of the candidate data sets occupies a maximum amount of unique storage space consumed by unique sampled data units in respective candidate data sets, wherein the unique sampled data units of a candidate data set is not shared with any other candidate data set.

12. The non-transitory machine-readable storage medium of claim 11, wherein the instructions are executable by the at least one processor to determine the unique sampled data units of the candidate data set based on the sampled signatures in the signature array.

13. The non-transitory machine-readable storage medium of claim 12, wherein the instructions are executable by the at least one processor to:

determine the unique sampled data units of the candidate data set based on unique sampled signatures associated with the candidate data set.

14. A system comprising:

a processor; and a non-transitory machine-readable medium storing instructions executable on the processor to:

maintain, in a data structure of a database, an entity array for a plurality of entities, wherein the plurality of entities comprise writable entities and read-only entities and are associated with sampled data units from a cluster of nodes in a distributed storage, wherein each corresponding entity of the plurality of entities comprises of an ancestor data indicating a presence of any relationship between the corresponding entity and another entity;

maintain, in the database, lineage information of a group of entities of the plurality of entities based on the ancestor data, wherein the lineage information represents relationships among the entities of the group of entities, and the group of entities is on a first node of the cluster of nodes;

receive a query to migrate data;

in response to the query:

determine a data set for migration from the first node to a destination node of the cluster of nodes, wherein the determining of the data set for migration is based on:

identifying, based on the lineage information, candidate data sets comprising a first candidate set including sampled data units of a first subset of entities from the group of entities, and a second candidate set including sampled data units of a second subset of entities from the group of entities, and selecting the data set from among the candidate data sets based on comparing amounts of storage space occupied in the first node by the first subset of entities and by the second subset of entities; and migrate the data set from the first node to the destination node.

15. The system of claim 14, wherein the selecting of the data set from among the candidate data sets comprises:

determining which of the candidate data sets occupies a maximum amount of unique storage space consumed by unique sampled data units in respective candidate data sets, wherein the unique sampled data units of a candidate data set are not shared with any other candidate data set.

16. The system of claim 15, wherein the migrating of the data set moves unique sampled data units of the data set from the first node to the destination node and frees up storage space at the first node corresponding to the moved unique sampled data units of the data set.

17. The system of claim 16, wherein the migrating of the data set copies shared sampled data units of the data set from the first node to the destination node such that the shared sampled data units of the data set remain at the first node.

18. The system of claim 14, wherein the query specifies a quantity of data units that are to be freed at the first node based on migrating data.

19. The system of claim 14, wherein the instructions are executable on the processor to:

determine sampled data units of the data set for migration at the first node;

determine, for each respective node of the cluster of nodes, a count of the sampled data units of the data set present in the respective node; and select a given node from the cluster of nodes with a largest count of the sampled data units of the data set as the destination node.

* * * * *